US011900057B2

(12) United States Patent
Ivan et al.

(10) Patent No.: US 11,900,057 B2
(45) Date of Patent: Feb. 13, 2024

(54) CORRECTING INPUT BASED ON USER CONTEXT

(71) Applicant: Apple Inc., Cupertino, CA (US)

(72) Inventors: Jason J. Ivan, Gilroy, CA (US); Christopher S. Linn, Palo Alto, CA (US); Douglas R. Davidson, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/683,179

(22) Filed: Feb. 28, 2022

(65) Prior Publication Data

US 2022/0366137 A1 Nov. 17, 2022

Related U.S. Application Data

(63) Continuation of application No. 15/702,587, filed on Sep. 12, 2017, now Pat. No. 11,263,399.

(60) Provisional application No. 62/538,979, filed on Jul. 31, 2017.

(51) Int. Cl.
| | |
|---|---|
| *G06F 3/048* | (2013.01) |
| *G06F 40/274* | (2020.01) |
| *G06F 16/33* | (2019.01) |
| *G06F 40/211* | (2020.01) |
| *G06F 40/242* | (2020.01) |
| *G06F 40/279* | (2020.01) |
| *G06F 3/04842* | (2022.01) |

(52) U.S. Cl.
CPC ........ *G06F 40/274* (2020.01); *G06F 16/3344* (2019.01); *G06F 40/211* (2020.01); *G06F 40/242* (2020.01); *G06F 40/279* (2020.01); *G06F 3/04842* (2013.01)

(58) Field of Classification Search
CPC ...... G06F 40/232; G06F 40/166; G06F 40/58; G06F 40/242; G06F 3/0237; G06F 16/3322; G06F 16/90324; G06F 40/20; G06F 3/048; G06F 3/04817; G06F 40/274; G06F 40/211; G06F 40/279; G06F 16/3344
See application file for complete search history.

(56) References Cited

U.S. PATENT DOCUMENTS

| | | | | |
|---|---|---|---|---|
| 5,875,443 | A * | 2/1999 | Nielsen | G06F 40/232 |
| 6,961,722 | B1 * | 11/2005 | Bruecken | G06F 16/338 |
| | | | | 715/236 |
| 7,100,123 | B1 * | 8/2006 | Todd | G06F 16/30 |
| | | | | 715/272 |

(Continued)

*Primary Examiner* — Steven B Theriault
(74) *Attorney, Agent, or Firm* — FLETCHER YODER PC (57) ABSTRACT

In some implementations, a computing device can generate user input correction suggestions based on the user's context. For example, the user's context can include content that the user has open or has recently opened on the computing device or another computing device. For example, when the user opens an item of content, the computing device can generate a context dictionary that includes words, phrases, etc., that describe the opened content. When the user provides input (e.g., text, speech, etc.) the computing device can use the context dictionary to generate input correction suggestions. The computing device can synchronize the context dictionary with other computing devices that the user may be using so that the user's context on one device can be used by another device to generate input correction suggestions.

20 Claims, 5 Drawing Sheets

(56) References Cited

U.S. PATENT DOCUMENTS

| | | | | |
|---|---|---|---|---|
| 7,426,699 | B2* | 9/2008 | Schneider | H04L 67/02 719/329 |
| 7,581,188 | B2* | 8/2009 | Hiles | H04M 1/72454 715/744 |
| 7,890,888 | B2* | 2/2011 | Glasgow | G06F 3/0482 715/825 |
| 8,160,564 | B1* | 4/2012 | Gunasekara | H04M 1/72415 455/420 |
| 8,290,772 | B1* | 10/2012 | Cohen | G06F 40/274 704/235 |
| 8,392,453 | B2* | 3/2013 | Baluja | G06F 40/242 707/771 |
| 8,700,987 | B2* | 4/2014 | Spalink | G06F 16/34 715/233 |
| 8,719,027 | B2* | 5/2014 | Chen | G10L 13/08 704/260 |
| 8,775,165 | B1* | 7/2014 | Oikawa | G06F 40/169 704/10 |
| 8,868,587 | B1* | 10/2014 | Subramaniam | G06F 16/951 707/759 |
| 8,943,094 | B2* | 1/2015 | Brown | G06F 16/93 706/45 |
| 9,092,403 | B2* | 7/2015 | Lee | G06F 40/157 |
| 9,147,275 | B1* | 9/2015 | Hyde-Moyer | G06V 30/248 |
| 9,183,306 | B2* | 11/2015 | Robarts | G06F 16/9535 |
| 9,208,144 | B1* | 12/2015 | Abdulnasyrov | G06F 40/42 |
| 9,237,189 | B2* | 1/2016 | Parks | H04L 67/148 |
| 9,337,999 | B2* | 5/2016 | Iqbal | G06F 9/4856 |
| 9,342,233 | B1* | 5/2016 | Dimson | G06F 40/242 |
| 9,824,084 | B2* | 11/2017 | Zelenkov | G06F 40/242 |
| 9,916,307 | B1* | 3/2018 | Kochura | G06F 40/247 |
| 9,983,771 | B2* | 5/2018 | Martin | H04N 21/43076 |
| 10,108,726 | B2* | 10/2018 | Scott | G06F 40/166 |
| 10,354,650 | B2* | 7/2019 | Gruenstein | G10L 15/32 |
| 2002/0126097 | A1* | 9/2002 | Savolainen | G06F 3/0237 345/168 |
| 2003/0028369 | A1* | 2/2003 | Aso | G10L 13/08 704/E13.011 |
| 2003/0135582 | A1* | 7/2003 | Allen | G06F 16/9535 709/217 |
| 2003/0160830 | A1* | 8/2003 | DeGross | G06F 40/242 715/808 |
| 2004/0102957 | A1* | 5/2004 | Levin | H04L 51/066 704/3 |
| 2004/0138872 | A1* | 7/2004 | Nir | G06F 40/242 704/10 |
| 2004/0201607 | A1* | 10/2004 | Mulvey | G06F 3/0237 715/708 |
| 2005/0099398 | A1* | 5/2005 | Garside | G06F 3/04883 345/173 |
| 2005/0114120 | A1* | 5/2005 | Bhaskaran | H04L 67/5651 713/150 |
| 2005/0165642 | A1* | 7/2005 | Brouze | G06Q 30/02 705/14.69 |
| 2005/0262521 | A1* | 11/2005 | Kesavarapu | G06F 9/543 719/320 |
| 2005/0289141 | A1* | 12/2005 | Baluja | G06F 40/242 |
| 2006/0004571 | A1* | 1/2006 | Ju | G10L 15/187 704/E15.02 |
| 2006/0136223 | A1* | 6/2006 | Brun | G06F 40/58 704/277 |
| 2006/0230350 | A1* | 10/2006 | Baluja | G06N 7/01 715/700 |
| 2007/0011160 | A1* | 1/2007 | Ferland | G06F 40/237 |
| 2007/0074131 | A1* | 3/2007 | Assadollahi | G06F 40/242 715/236 |
| 2007/0136231 | A1* | 6/2007 | Padmanabhan | G06F 16/9558 |
| 2007/0233692 | A1* | 10/2007 | Lisa | G06F 16/3328 |
| 2007/0265829 | A1* | 11/2007 | Turner | G06F 40/237 704/9 |
| 2007/0265831 | A1* | 11/2007 | Dinur | G06F 40/232 704/10 |
| 2008/0005071 | A1* | 1/2008 | Flake | G06F 16/29 |
| 2008/0091411 | A1* | 4/2008 | Williams | G06F 40/247 704/9 |
| 2008/0098005 | A1* | 4/2008 | Goradia | G06F 16/9535 |
| 2008/0098302 | A1* | 4/2008 | Roose | G06F 40/242 715/257 |
| 2008/0195388 | A1* | 8/2008 | Bower | G10L 15/19 704/E15.021 |
| 2008/0229218 | A1* | 9/2008 | Maeng | G06F 3/048 715/808 |
| 2008/0243736 | A1* | 10/2008 | Rieman | G06F 3/0237 706/18 |
| 2008/0281583 | A1* | 11/2008 | Slothouber | G06F 16/9535 704/10 |
| 2008/0313182 | A1* | 12/2008 | Vasa | H04M 1/2748 |
| 2009/0094221 | A1* | 4/2009 | Cameron | G06F 16/3322 707/999.005 |
| 2009/0216690 | A1* | 8/2009 | Badger | H04M 1/2748 706/46 |
| 2009/0241104 | A1* | 9/2009 | Amiga | G06F 8/65 717/174 |
| 2009/0288037 | A1* | 11/2009 | Lawton | G06F 9/451 715/804 |
| 2010/0011299 | A1* | 1/2010 | Brodersen | H04L 67/75 715/740 |
| 2010/0114887 | A1* | 5/2010 | Conway | G06F 3/0237 707/E17.014 |
| 2010/0122194 | A1* | 5/2010 | Rogers | G06F 3/0488 715/769 |
| 2010/0161733 | A1* | 6/2010 | Bower | G06F 3/0237 709/206 |
| 2010/0241663 | A1* | 9/2010 | Huang | G06Q 30/02 707/E17.014 |
| 2010/0275118 | A1* | 10/2010 | Iakobashvili | G06F 40/253 715/810 |
| 2011/0014944 | A1* | 1/2011 | Samoylov | H04M 1/72403 704/E15.001 |
| 2011/0167350 | A1* | 7/2011 | Hoellwarth | G06F 3/04883 345/173 |
| 2011/0201387 | A1* | 8/2011 | Paek | G06F 40/166 455/566 |
| 2011/0202836 | A1* | 8/2011 | Badger | G06F 40/274 715/825 |
| 2011/0246575 | A1* | 10/2011 | Murayama | G06F 16/93 709/204 |
| 2012/0046068 | A1* | 2/2012 | Katpelly | G06F 16/284 455/550.1 |
| 2012/0072867 | A1* | 3/2012 | Schlegel | G06F 3/0482 715/808 |
| 2012/0089400 | A1* | 4/2012 | Henton | G10L 13/02 704/260 |
| 2012/0117101 | A1* | 5/2012 | Unruh | G06F 40/274 707/765 |
| 2012/0117499 | A1* | 5/2012 | Mori | G06F 3/0481 715/765 |
| 2012/0150533 | A1* | 6/2012 | O'Neill | G06F 40/242 704/9 |
| 2012/0150848 | A1* | 6/2012 | O'Neill | G06F 40/242 707/723 |
| 2012/0173222 | A1* | 7/2012 | Wang | G06F 40/274 715/708 |
| 2012/0203541 | A1* | 8/2012 | Liu | G06F 3/0236 704/8 |
| 2012/0233567 | A1* | 9/2012 | Brown | G06F 3/0484 715/810 |
| 2012/0296635 | A1* | 11/2012 | Brockett | G06F 40/166 704/9 |
| 2012/0303371 | A1* | 11/2012 | Labsky | G10L 15/14 704/E13.011 |
| 2012/0304124 | A1* | 11/2012 | Chen | G06F 3/0236 715/825 |
| 2012/0324337 | A1* | 12/2012 | Mbenkum | G06F 40/169 715/234 |
| 2012/0330669 | A1* | 12/2012 | Narayanan | G10L 21/06 704/271 |

(56) References Cited

U.S. PATENT DOCUMENTS

| | | | |
|---|---|---|---|
| 2013/0046544 A1* | 2/2013 | Kay | G06F 3/023 345/169 |
| 2013/0108115 A1* | 5/2013 | Hwang | G06V 30/127 382/161 |
| 2013/0159847 A1* | 6/2013 | Banke | G06F 40/242 715/259 |
| 2013/0166734 A1* | 6/2013 | Bakke | H04L 67/142 709/224 |
| 2013/0275120 A1* | 10/2013 | DeGross | G06F 40/40 704/9 |
| 2013/0311481 A1* | 11/2013 | Bhatt | G06F 16/31 707/741 |
| 2014/0089947 A1* | 3/2014 | Han | G06F 3/048 719/328 |
| 2014/0104175 A1* | 4/2014 | Ouyang | G06F 40/253 345/168 |
| 2014/0143196 A1* | 5/2014 | White | G06F 16/9537 706/46 |
| 2014/0163954 A1* | 6/2014 | Joshi | G06F 3/0237 704/9 |
| 2014/0244239 A1* | 8/2014 | Nicholson | G06F 40/242 704/9 |
| 2014/0281943 A1* | 9/2014 | Prilepov | G06F 40/242 715/257 |
| 2014/0303964 A1* | 10/2014 | Kennard | G06F 40/242 704/10 |
| 2014/0317495 A1* | 10/2014 | Lau | G06F 40/232 715/257 |
| 2014/0354550 A1* | 12/2014 | Mendonca | G06F 3/02 345/168 |
| 2014/0358962 A1* | 12/2014 | Wantland | G06F 16/3322 707/769 |
| 2015/0067486 A1* | 3/2015 | Hochman | G06F 40/232 715/257 |
| 2015/0067491 A1* | 3/2015 | Rajamony | G06F 16/90328 715/271 |
| 2015/0088493 A1* | 3/2015 | Thakore | G06F 40/242 704/10 |
| 2015/0100301 A1* | 4/2015 | Phadke | G06F 40/47 704/4 |
| 2015/0127346 A1* | 5/2015 | Gruenstein | G10L 15/08 704/254 |
| 2015/0186347 A1* | 7/2015 | Taniguchi | G06F 16/3322 715/256 |
| 2015/0309667 A1* | 10/2015 | Wang | G06F 9/451 715/781 |
| 2015/0309984 A1* | 10/2015 | Bradford | G06F 40/263 704/8 |
| 2015/0331855 A1* | 11/2015 | Rylov | G06F 40/242 704/2 |
| 2015/0346946 A1* | 12/2015 | Kelso | G06F 3/0484 715/763 |
| 2016/0048270 A1* | 2/2016 | An | G06F 3/04886 715/773 |
| 2016/0065626 A1* | 3/2016 | Jain | H04L 67/306 709/205 |
| 2016/0088064 A1* | 3/2016 | Chen | H04L 67/568 709/204 |
| 2016/0098091 A1* | 4/2016 | Hwang | G06F 21/606 715/761 |
| 2016/0110327 A1* | 4/2016 | Knox | G06F 40/274 704/9 |
| 2016/0196150 A1* | 7/2016 | Jing | G06F 40/129 715/708 |
| 2016/0224540 A1* | 8/2016 | Stewart | G06F 40/232 |
| 2016/0267128 A1* | 9/2016 | Dumoulin | G06F 16/3329 |
| 2016/0328577 A1* | 11/2016 | Howley | G16H 20/60 |
| 2016/0357730 A1* | 12/2016 | Eberbach | G06F 40/242 |
| 2016/0359771 A1* | 12/2016 | Sridhar | H04L 51/02 |
| 2016/0366534 A1* | 12/2016 | Griesmann | H04L 67/12 |
| 2017/0052659 A1* | 2/2017 | Ivanov | G06F 16/90324 |
| 2017/0053110 A1* | 2/2017 | Wang | G06F 9/4856 |
| 2017/0064755 A1* | 3/2017 | Ha | H04B 5/0031 |
| 2017/0098159 A1* | 4/2017 | Sharifi | G06F 3/0481 |
| 2017/0103057 A1* | 4/2017 | Guerra | G06F 40/232 |
| 2017/0116174 A1* | 4/2017 | Peterson | G06F 40/274 |
| 2017/0199631 A1* | 7/2017 | Coffman | H04L 51/04 |
| 2017/0220536 A1* | 8/2017 | Chiba | G06F 40/232 |
| 2017/0249017 A1* | 8/2017 | Ryu | G06F 3/018 |
| 2017/0337176 A1* | 11/2017 | Cietwierkowski | G06Q 10/107 |
| 2017/0357401 A1* | 12/2017 | Fleizach | G06F 3/1454 |
| 2018/0032499 A1* | 2/2018 | Hampson | G06F 40/232 |
| 2018/0040020 A1* | 2/2018 | Kurian | G06Q 30/0256 |
| 2018/0143956 A1* | 5/2018 | Skarbovsky | G06F 40/166 |
| 2018/0143970 A1* | 5/2018 | Skarbovsky | G06F 16/685 |
| 2018/0143974 A1* | 5/2018 | Skarbovsky | G06F 40/58 |
| 2018/0144747 A1* | 5/2018 | Skarbovsky | G06F 40/109 |
| 2018/0217974 A1* | 8/2018 | Hwang | G06F 3/023 |
| 2018/0217975 A1* | 8/2018 | Hwang | G06F 40/242 |
| 2018/0366116 A1* | 12/2018 | Nicholson | G10L 15/22 |
| 2019/0018584 A1* | 1/2019 | Jung | G06F 3/04883 |
| 2019/0042556 A1* | 2/2019 | Anders | G06F 40/56 |
| 2019/0289655 A1* | 9/2019 | Zhao | H04W 76/14 |

* cited by examiner

CORRECTING INPUT BASED ON USER CONTEXT

RELATED APPLICATION

This application is a continuation of U.S. patent application Ser. No. 15/702,587, entitled "Correcting Input Based on User Context," filed Sep. 12, 2017, which claims priority to U.S. Provisional Application No. 62/538,979, entitled "Correcting Input Based on User Context," filed on Jul. 31, 2017, both of which are incorporated herein by reference in their entireties for all purposes.

TECHNICAL FIELD

The disclosure generally relates to generating suggestions for correcting user input.

BACKGROUND

User input correction mechanisms are commonplace on modern computing devices. For example, a computing device can receive textual input, detect a spelling error in a word or grammatical error in a phrase or a sentence and recommend or suggest a correction. However, these input correction technologies do not take into account the user's or device's context when determining and/or making a suggestion for a correction.

SUMMARY

In some implementations, a computing device can generate user input correction suggestions based on the user's context. For example, the user's context can include content that the user has open or has recently opened on the computing device or another computing device. For example, when the user opens an item of content, the computing device can generate a context dictionary that includes words, phrases, etc., that describe the opened content. When the user provides input (e.g., text, speech, etc.) the computing device can use the context dictionary to generate input correction suggestions. The computing device can synchronize the context dictionary with other computing devices that the user may be using so that the user's context on one device can be used by another device to generate input correction suggestions.

Particular implementations provide at least the following advantages. The computing device can provide correction suggestions that are relevant to the user's current activities on one or more of the user's computing devices.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Figure 1:
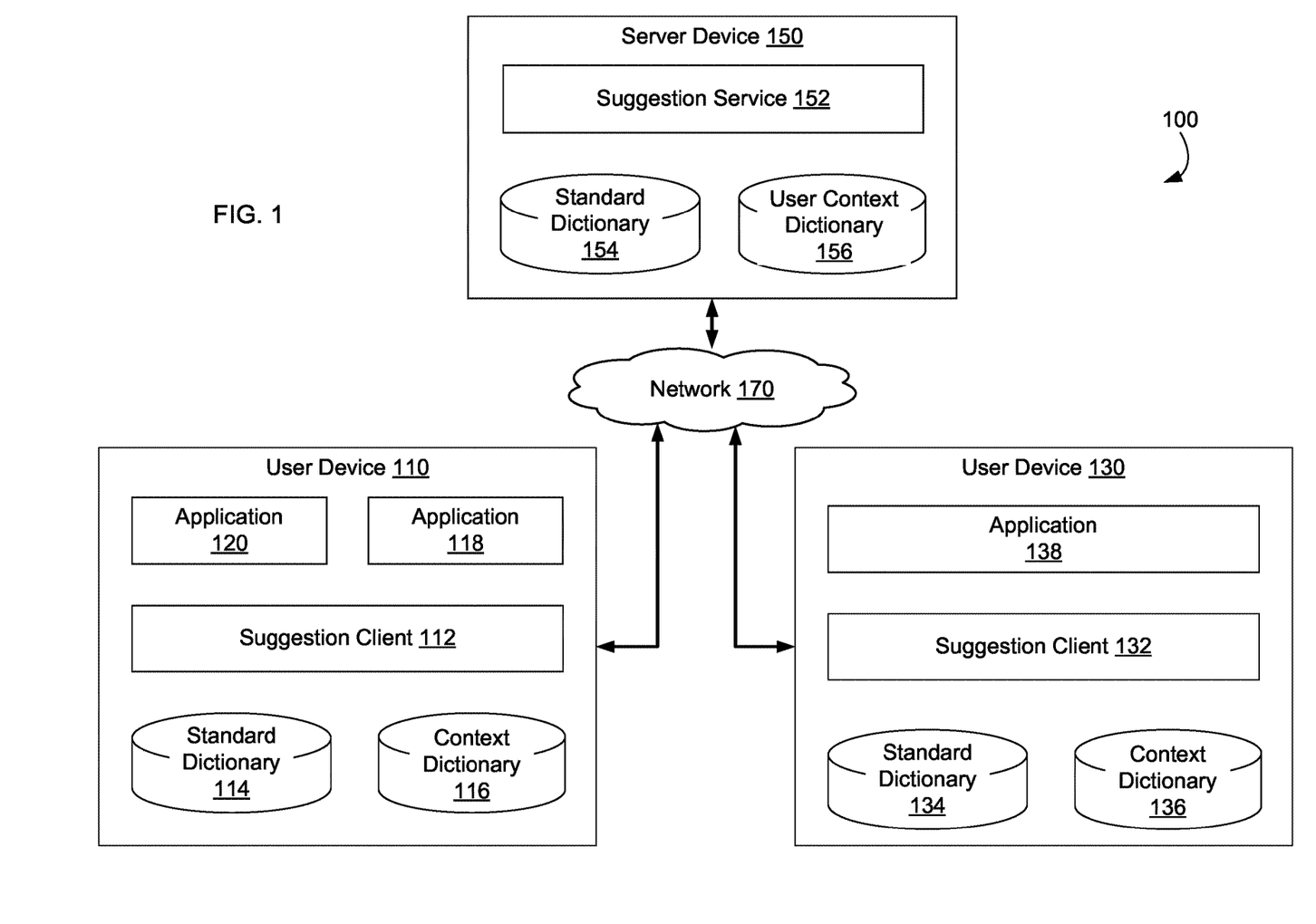
FIG. 1 is a block diagram of an example system for automatically correcting user input based on user context.

FIG. 1 is a block diagram of an example system 100 for automatically correcting user input based on user context. For example, system 100 can suggest corrections to user input based on content (e.g., word processing document, email message, text message, contact card, webpage, etc.) that the user is viewing and/or has recently viewed on one or more of the user's devices. The selected and/or recently viewed content can provide context clues that allow system 100 to suggest corrections to the user's input.

In some implementations, system 100 can include user device 110. For example, user device 110 can be a laptop computer, desktop computer, tablet computer, smartphone, smart watch, in-car infotainment system, and/or other computing device.

In some implementations, user device 110 can include suggestion client 112. For example, suggestion client 112 can collect context data (e.g., text describing selected and/or viewed content) and/or generate suggestions for correcting user input based on the collected context data.

In some implementations, suggestion client 112 can provide user input correction functionality based on a default or standard dictionary 114. For example, standard dictionary 114 can include words, phrases, grammatical rules, etc., for one or more languages used by user device 110. When a user provides input (e.g., textual input, voice input, etc.), suggestion client 112 can suggest alternatives to the user's input based on the data in standard dictionary 114. For example, if the user enters text input that misspells a word, suggestion client 112 can determine a correct replacement word for the misspelled word based on standard dictionary 114. Standard dictionary 114 can include the same data across devices, for example.

In some implementations, suggestion client 112 can provide user input correction functionality based on context dictionary 116. For example, context dictionary 116 can be dynamically generated by suggestion client 112. When a user selects content to view on user device 110, suggestion client 112 can determine, based on the selected content, words, phrases, ideas, etc., that describe the content the user has selected to view. For example, suggestion client 112 can parse the text of the content and/or content metadata to determine words, phrases, ideas, etc., described in the content. Suggestion client 112 can generate entries in context dictionary 116 that includes the words, phrases, ideas, etc., parsed from the selected content. Each context dictionary entry can include, for example, a word from the selected content, a timestamp indicating when the word was added to the context dictionary, and/or a timestamp indicating when the corresponding content item was closed (e.g., is no longer being accessed by the user). When a user provides input (e.g., textual input, voice input, etc.), suggestion client 112 can suggest alternatives to the user's input based on the data in context dictionary 116. For example, if the user enters text input that misspells a word, suggestion client 112 can determine a correct replacement word for the misspelled word based on context dictionary 114. If the user enters ambiguous input, suggestion client 112 can disambiguate the input based on the data stored in context dictionary 116.

In some implementations, suggestion client 112 can prevent a standard dictionary correction based on context dictionary 114. For example, a user may enter text corresponding to a word that is not included in standard dictionary 114. Suggestion client 112 may determine that the entered word includes an error, is unknown, or misspelled because the word is not included in standard dictionary 114 and cause user device 110 to present an indication that the entered word is misspelled and/or present suggested corrections for the entered word. However, in some cases, the entered word may correspond to a term, person's name, or other type of word not included in standard dictionary 114 but included in content the user has recently selected to view on user device 110 (or some other user device, such as user device 130). In addition to comparing the entered word to entries in standard dictionary 114, suggestion client 112 may compare the entered word to entries in context dictionary 116. When suggestion client 112 finds a context entry in context dictionary 116 that matches the entered word, suggestion client 112 can determine that, even though the word is not in standard dictionary 114, the entered word is not an error or misspelled word because the entered word is in context dictionary 116. When the entered word is found in context dictionary 116, suggestion client 112 can prevent a user device 110 from presenting an indication that the entered word is misspelled and/or presenting suggested corrections for the entered word.

In some implementations, suggestion client 112 can ignore or remove entries in context dictionary when a period of time elapses. For example, context dictionary entries that do not have a timestamp indicating that the corresponding content item is closed can be considered active context entries. Context dictionary entries that have a timestamp indicating that the corresponding content item is closed and where the amount of time that has elapsed since the content item was closed is less than the configured period of time can be considered active context entries. Context dictionary entries that have a timestamp indicating that the corresponding content item is closed and where the amount of time that has elapsed since the content item was closed is greater than the configured period of time can be considered inactive context entries. When generating suggested replacement words or input, suggestion client 112 can use the active context entries in context dictionary 116 to generate the replacement input suggestions. Suggestion client 112 can ignore or remove inactive context entries in context dictionary 116. Thus, suggestion client 112 can generate suggestions based on currently open content items and/or recently closed content items.

In some implementations, context dictionary 116 can be synchronized between devices associated with the same user so that content selected by the user on one device can influence alternative word suggestions on another user device. For example, system 100 can include user device 130. User device 130 can be configured similarly to user device 110. For example, user device 130 can include suggestion client 132 corresponding to suggestion client 112. User device 130 can include standard dictionary 134 corresponding to standard dictionary 114. User device 130 can include context dictionary 136 corresponding to context dictionary 116. When suggestion client 132 modifies context dictionary 136 on user device 130 based on content selected by the user on user device 130, suggestion client 132 can synchronize context dictionary 136 with context dictionary 116 on use device 110 so that each user device has the same context dictionary. Thus, when suggestion client 112 suggests an alternative word in response to receiving user input on user device 110, suggestion client 112 can generate the suggestion based on content selected by the user on user device 130.

In some implementations, system 100 can include server device 150. For example, server device 150 can represent a computing device or multiple computing devices configured to provide a network based suggestion service 152. Like user device 110 and user device 130, server device 150 can include a standard dictionary 154 and a user context dictionary 156. For example, when user device 110 and/or user device 130 updates their respective context dictionaries 116/136, user device 110 and/or user device 130 can synchronize their context dictionaries with user context dictionary 156 on server device 150 through network 170 (e.g., local area network, wide area network, wireless network, the Internet, etc.). In some implementations, the synchronization of context dictionary 116 on user device 110 and context dictionary 136 on user device 130 can be performed through user context dictionary 156 on server device 150. In some implementations, user device 130 and user device 110 can synchronize their context dictionaries directly without using server device 150.

In some implementations, suggestion service 152 can provide user input correction suggestions to user device 110 and/or user device 130. For example, when a user selects and/or opens a content item on user device 130, suggestion client 132 can update context dictionary 136 based on the content of the content item, as described above. Suggestion client 132 can then synchronize content dictionary 136 with user context dictionary 156 on server device 150. Similarly, when the user selects and/or opens a content item on user device 110, suggestion client 112 can update context dictionary 116 based on the content of the content item, as described above. Suggestion client 112 can then synchronize content dictionary 116 with user context dictionary 156 on server device 150 through network 170 (e.g., the Internet). When the user provides input (e.g., text input, voice input, etc.) to user device 110, suggestion client 112 can send the user input to suggestion service 152. Suggestion service 152 can then generate suggestions for correcting the user input and send the suggestions to suggestion client 112. Suggestion client 112 can then present the suggested corrections on a display of user device 110 so that the user can select a suggested correction. In some implementations, suggestion client 112 can automatically change the user input to automatically correct the user input according to a correction suggested by suggestion service 152. Thus, suggestion client 112 can generate suggested corrections locally at user device 110 and/or receive suggested corrections from suggestion service 152 on server device 150.

In some implementations, user device 110 and/or user device 130 can include applications, utilities, operating systems, or other software functions. For example, these software functions are represented by applications 118, 120 for user device 110 and application 138 for user device 130. For example, applications 118, 120, and 128 can correspond to word processing applications, web browsers, web applications, a contacts application (e.g., address book), electronic mail applications, electronic messaging applications, social media applications, and/or any other type of application that can be used by the user to select and/or view content. These applications can interact with the local suggestion client (e.g., suggestion client 112 for user device 110, suggestion client 132 for user device 130) to send the suggestion client content selected by the user so that the suggestion client can generate the local context dictionary. These applications can interact with the local suggestion client to receive user input correction suggestions from the suggestion client based on the content recently selected by the user.

Figure 2:
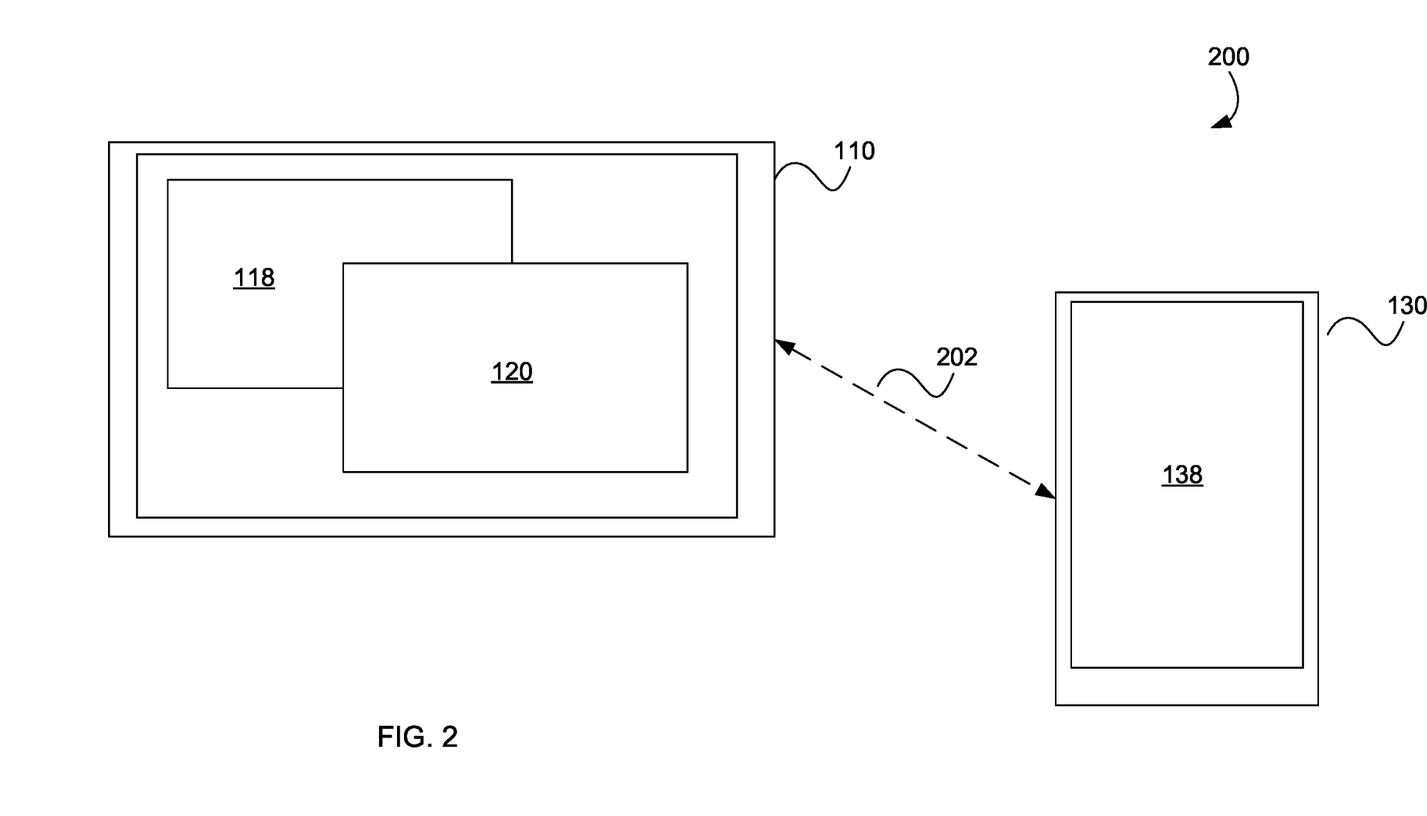
FIG. 2 is an example illustration depicting graphical user interfaces of two user devices.

FIG. 2 is an example illustration 200 depicting graphical user interfaces of two user devices. Illustration 200 will be used to describe various use cases for system 100 described above. For example, illustration 200 includes user device 110 and user device 130, as described above with respect to system 100. Illustration 200 also includes applications 118 and 120 on user device 110 and application 138 on user device 130. The synchronization of context libraries between user device 110 and user device 130 is represented by dashed line 202. As described above, the synchronization of context libraries can be performed directly between user device 110 and user device 130 or through server device 150. While some of the use cases described below are described with reference to operations performed on a single device (e.g., user device 110), similar operations may be distributed across multiple devices (e.g., user device 110 and user device 130. Similarly, where use cases describe operations performed across multiple devices, similar operations can be performed within a single device.

Autocorrect Based on Context

In a first example use case, application 118 can correspond to a web browser and application 120 can correspond to a word processing application. The user may interact with web browser 118 to do research on bears. While viewing a website describing bears, web browser 118 can send the website content to suggestion client 112. Suggestion client 112 can generate context dictionary entries based on the content of the website describing bears. While the website is still open or shortly after closing browser application 118, the user types text, including the word "bares", into word processing application 120. Word processing application 120 communicates the textual user input to suggestion client 112. Suggestion client 112 determines, based on context dictionary 116, that the user was recently looking at content describing "bears" and generates a correction suggestion that indicates the word "bares" should be corrected to the word "bears". Suggestion client 112 can then send the correction suggestion to word processing application 120 where application 120 can replace the word "bares" with the word "bears."

In some implementations, the correction suggestion can include a graphic to be presented instead of or in addition to a word. For example, rather than suggesting that the word "bares" be corrected with the word "bears," suggestion client 112 can suggest that the word "bares" be replaced with the word "bears" and/or a graphic (e.g., emoji, icon, picture, etc.) representing a bear.

Autocorrect in Email

In a second example use case, application 138 can correspond to an email application. For example, the user may receive an email from a person named "Leezah" or she may be mentioned in an email thread or on the CC list but is not in the user's address book or contacts application. When the email is opened or selected by the user, email application 138 can send the content of the email message and/or message thread to suggestion client 132. Suggestion client 132 can generate context dictionary entries on context dictionary 136 based on the content of the email message or thread, including the name "Leezah". When the user provides input to respond to the selected message or message thread, email application 138 may send the message thread to suggestion client 132 as user input to be analyzed and/or corrected. Normally, suggestion client 132 would identify "Leezah" as a misspelled word. However, since the word "Leezah" is within the context dictionary 136, suggestion client 132 can determine that "Leezah" is not a spelling mistake and suggestion client 132 will not suggest a correction for the word "Leezah".

Later, when the user is typing the email response, the user may enter the word "Liza." This input can be sent by email application 138 to suggestion client 132. Suggestion client 132 can analyze context dictionary 136, determine that "Liza" is not an entry in context dictionary 136 but "Leezah" is. Suggestion client 132 can then generate a correction suggestion suggesting that the input "Liza" be replaced by "Leezah" and send the correction suggestion to email application 138. Email application 138 can then present the correction suggestion to the user and the user can provide input selecting the word "Leezah" as a replacement for the word "Liza."

Autocorrect Across Devices

In a third example use case and as a variation on the example email use case above, the user may store an address book or contacts application on one device but be responding to an email message on another device. For example, application 138 on user device 130 can correspond to the email application and application 118 on user device 110 can correspond to the address book application. The user may look up the email address for a contact named "Leezah" in application 118. Address book application 118 can send the content of the contact information for Leezah to suggestion client 112. Suggestion client 112 can generate context entries on context dictionary 116 for the contact information for Leezah, including the word "Leezah". As described above, context dictionary 116 can be synchronized with context dictionary 136 so that context dictionary 136 includes the context entries corresponding to the contact information for Leezah. When the user provides input to respond to the selected message or message thread, email application 138 may send the message thread to suggestion client 132 as user input to be analyzed and/or corrected. Normally, suggestion client 132 would identify "Leezah" as a misspelled word. However, since the word "Leezah" is within the context dictionary 136, suggestion client 132 can determine that "Leezah" is not a spelling mistake and suggestion client 132 will not suggest a correction for the word "Leezah".

Later, when the user is typing the email response, the user may enter the word "Liza." This input can be sent by email application 138 to suggestion client 132. Suggestion client 132 can analyze context dictionary 136, determine that "Liza" is not an entry in context dictionary 136 but "Leezah" is. Suggestion client 132 can then generate a correction suggestion suggesting that the input "Liza" be replaced by "Leezah" and send the correction suggestion to email application 138. Email application 138 can then present the correction suggestion to the user and the user can provide input selecting the word "Leezah" as a replacement for the word "Liza."

Voice Command Disambiguation

In a fourth example use case, application 138 can correspond to a voice assistant artificial intelligence application. The user may speak a command to application 138, such as "how are the Giants doing?" If there is an ambiguity in the command (e.g., currently there is a baseball season and football season overlap), application 138 may need to follow up with a clarifying question to determine whether the user wants to know about the Giants baseball team or the Giants football team. However, if the user has recently viewed a webpage related to Giants baseball, context dictionary 136 will have context entries related to Giants baseball. When the user asks "how are the Giants doing?", application 138 can send a text version of the user's voice input to suggestion client 132. Suggestion client 132 can determine that the user has recently viewed a webpage related to Giant's baseball and generate a correction suggestion indicating that "Giants" refers to the Giants baseball team and send the correction suggestion to application 138. Application 138 can then formulate a response to the user's request by determining how the Giants baseball team is doing in the current baseball season without asking the user for clarification as to whether the user meant the Giants baseball team or the Giants football team.

Example Processes

To enable the reader to obtain a clear understanding of the technological concepts described herein, the following processes describe specific steps performed in a specific order. However, one or more of the steps of a particular process may be rearranged and/or omitted while remaining within the contemplated scope of the technology disclosed herein. Moreover, different processes, and/or steps thereof, may be combined, recombined, rearranged, omitted, and/or executed in parallel to create different process flows that are also within the contemplated scope of the technology disclosed herein. Additionally, while the processes below may omit or briefly summarize some of the details of the technologies disclosed herein for clarity, the details described in the paragraphs above may be combined with the process steps described below to get a more complete and comprehensive understanding of these processes and the technologies disclosed herein.

Figure 3:
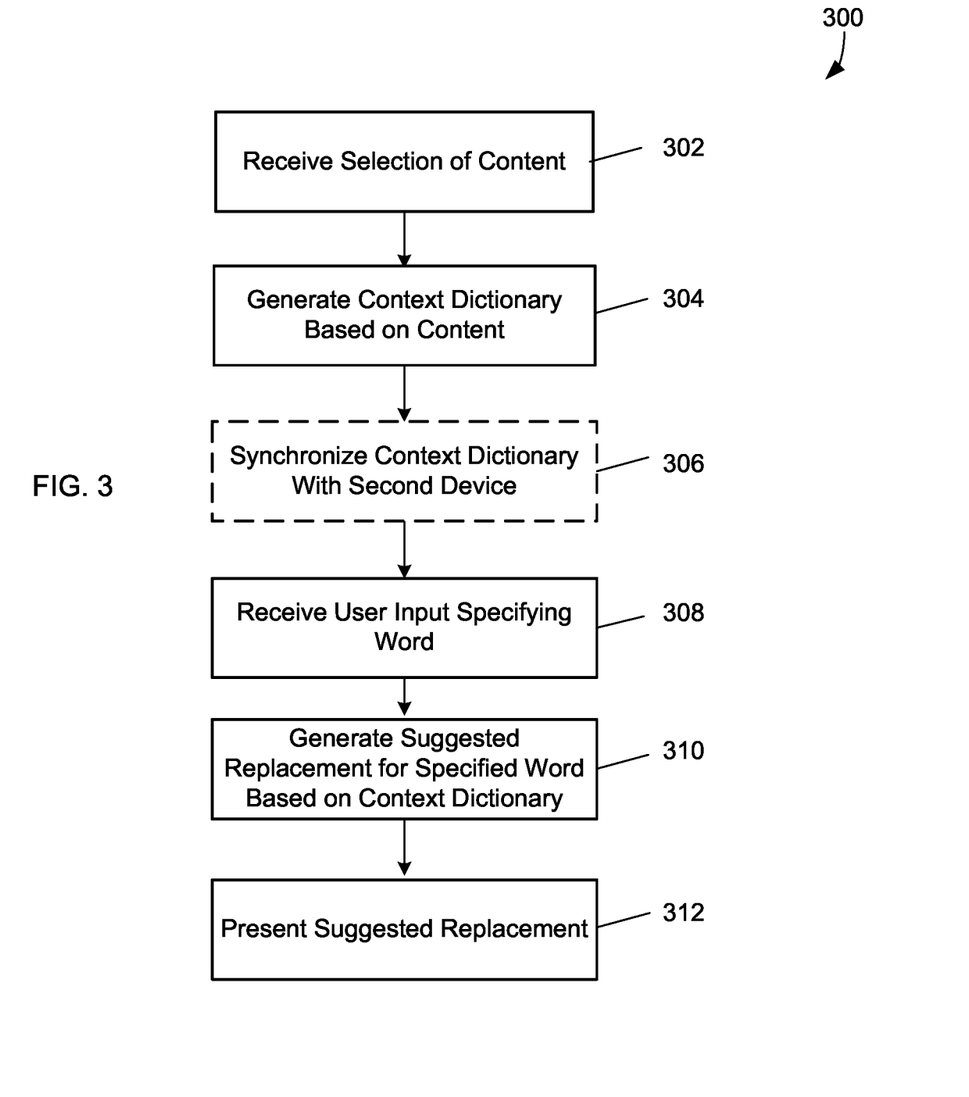
FIG. 3 is flow diagram of an example process for generating correction suggestions based on user context.

FIG. 3 is flow diagram of an example process 300 for generating correction suggestions based on user context. For example, process 300 can be performed by user device 110 to correct user input based on content that the user has recently selected to view.

At step 302, user device 110 can receive a selection of content. For example, user device 110 can receive user input selecting a webpage, contact information, word processing document, slideshow presentation, or any other type of content. The content can be selected by interacting with an application (e.g., web browser, address book application, word processing document, etc.) running on user device 110.

At step 304, user device 110 can generate a context dictionary based on the selected content. For example, the application (e.g., application 118, application 120) presenting the selected content can send the selected content to suggestion client 112. Suggestion client 112 can parse the selected content and generate context entries in context dictionary 116.

At optional step 306, user device 110 can synchronize the context dictionary with a second device. For example and as described above, user device 110 can synchronize context dictionary 116 with context dictionaries managed by user device 130 and/or server device 150. The synchronization allows user device 110 to share context updates made at user device 110 with other devices and allows user device 110 to receive context updates made at other devices so that correction suggestions can be made at user device 110 based on the user context determined at the other devices.

At step 308, user device 110 can receive user input specifying a word. For example, the user input can be textual input. The textual input can be input to a word processing document, instant message, email message, or any other textual input.

At step 310, user device 110 can generate a suggested replacement or correction for the specified word based on the context dictionary. For example, the application (e.g., application 118, application 120) that receives the user input can send the user input to suggestion client 112 on user device 110. Suggestion client 112 can send the user input to suggestion service 152 and suggestion service 152 can generate a correction suggestion based on the user's context dictionary and send the correction suggestion to suggestion client 112. Alternatively, suggestion client 112 can generate the correction suggestion locally based on context dictionary 116. The suggestion client 112 can generate the correction suggestion by comparing the user input to context entries in context dictionary 116 and determining candidate alternative words in the context dictionary that might be appropriate replacements for the user input. Suggestion client 112 can then send the correction suggestion, including a selected candidate alternative word, to the application that received the user input.

At step 312, user device 110 can present the suggested replacement word on a display of user device 110. For example, the application that receives the correction suggestion can present the correction suggestion (e.g., word, graphic, etc.) on a display of the user device for the user to select. Upon receiving a user selection of the correction suggestion, the application can replace to user input (e.g., word) with the selected correction suggestion. Alternatively, the application that receives the correction suggestion can automatically replace the user input with the correction suggestion.

Figure 4:
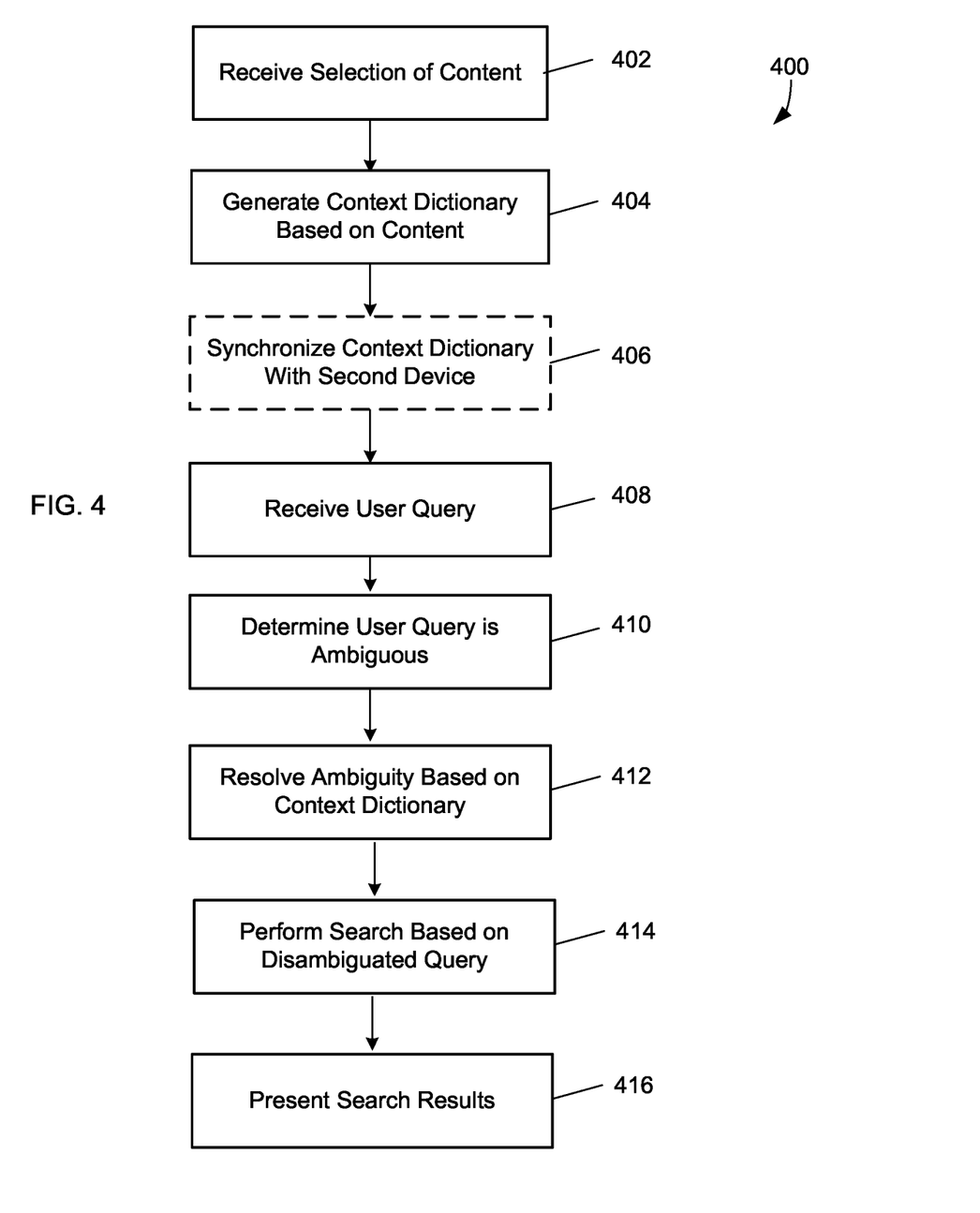
FIG. 4 is flow diagram of an example process for disambiguating user input based on user context.

FIG. 4 is flow diagram of an example process 400 for disambiguating user input based on user context. For example, process 400 can be performed by user device 110 to disambiguate user input based on content that the user has recently selected to view.

At step 402, user device 110 can receive a selection of content. For example, user device 110 can receive user input selecting a webpage, contact information, word processing document, slideshow presentation, or any other type of content. The content can be selected by interacting with an application (e.g., web browser, address book application, word processing document, etc.) running on user device 110.

At step 404, user device 110 can generate a context dictionary based on the selected content. For example, the application (e.g., application 118, application 120) presenting the selected content can send the selected content to suggestion client 112. Suggestion client 112 can parse the selected content and generate context entries in context dictionary 116, as described above.

At optional step 406, user device 110 can synchronize the context dictionary with a second device. For example and as described above, user device 110 can synchronize context dictionary 116 with context dictionaries managed by user device 130 and/or server device 150. The synchronization allows user device 110 to share context updates made at user device 110 with other devices and allows user device 110 to receive context updates made at other devices so that correction suggestions can be made at user device 110 based on the user context determined at the other devices.

At step 408, user device 110 can receive a user query. For example, the user query can be a spoken command or request received or detected by an application (e.g., stand-alone application, operating system function or utility, system library, system API, or other hardware and/or software system, etc.) on user device 110. The user query can be a textual command or request received as user input by an application on user device 110.

At step 410, user device 110 can determine that the user query is ambiguous. For example, when processing the user query, the receiving application can determine that there is more than one possible response to the user's query. For example, when the user's query poses the question "how are the Giants doing" during an overlap between baseball and football seasons, the application can determine that the user may be asking about either the Giants baseball team or the Giants football team. When there is more than one possible response, the application can determine that the user's query is ambiguous.

At step 412, user device 110 can resolve the ambiguity based on the context dictionary. For example, when the application that received the user's query determines that the query is ambiguous, the application can send the user's query (e.g., a textual representation of the user's query) to suggestion client 112. Suggestion client 112 can compare the words in the user's query to context entries in context dictionary 116 to determine additional words that may clarify the user's query. For example, if the user was recently viewing a webpage discussing the Giants baseball team, then suggestion client 112 can add the word "baseball" to the user's query as a correction suggestion to disambiguate the user query. Suggestion client 112 can send the correction suggestion to the application.

At step 414, user device 110 can perform a search based on the disambiguated user query. For example, the application can generate a response to the user's query "how are the Giants doing?" by performing an internet search using the query and the additional disambiguating word (e.g., correction suggestion) "baseball". The application can then receive search results related to the Giants baseball team.

At step 416, user device 110 can present the search results. For example, the application on user device 110 can present the search results related to the Giants baseball team using audio data (e.g., speech synthesis) and/or using graphical data (e.g., text, images, etc.) presented on the display of user device 110.

Graphical User Interfaces

This disclosure above describes various Graphical User Interfaces (GUIs) for implementing various features, processes or workflows. These GUIs can be presented on a variety of electronic devices including but not limited to laptop computers, desktop computers, computer terminals, television systems, tablet computers, e-book readers and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers to "select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radio buttons, checkboxes and any other mechanism for receiving input from, or providing feedback to a user.

Privacy

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Example System Architecture

Figure 5:
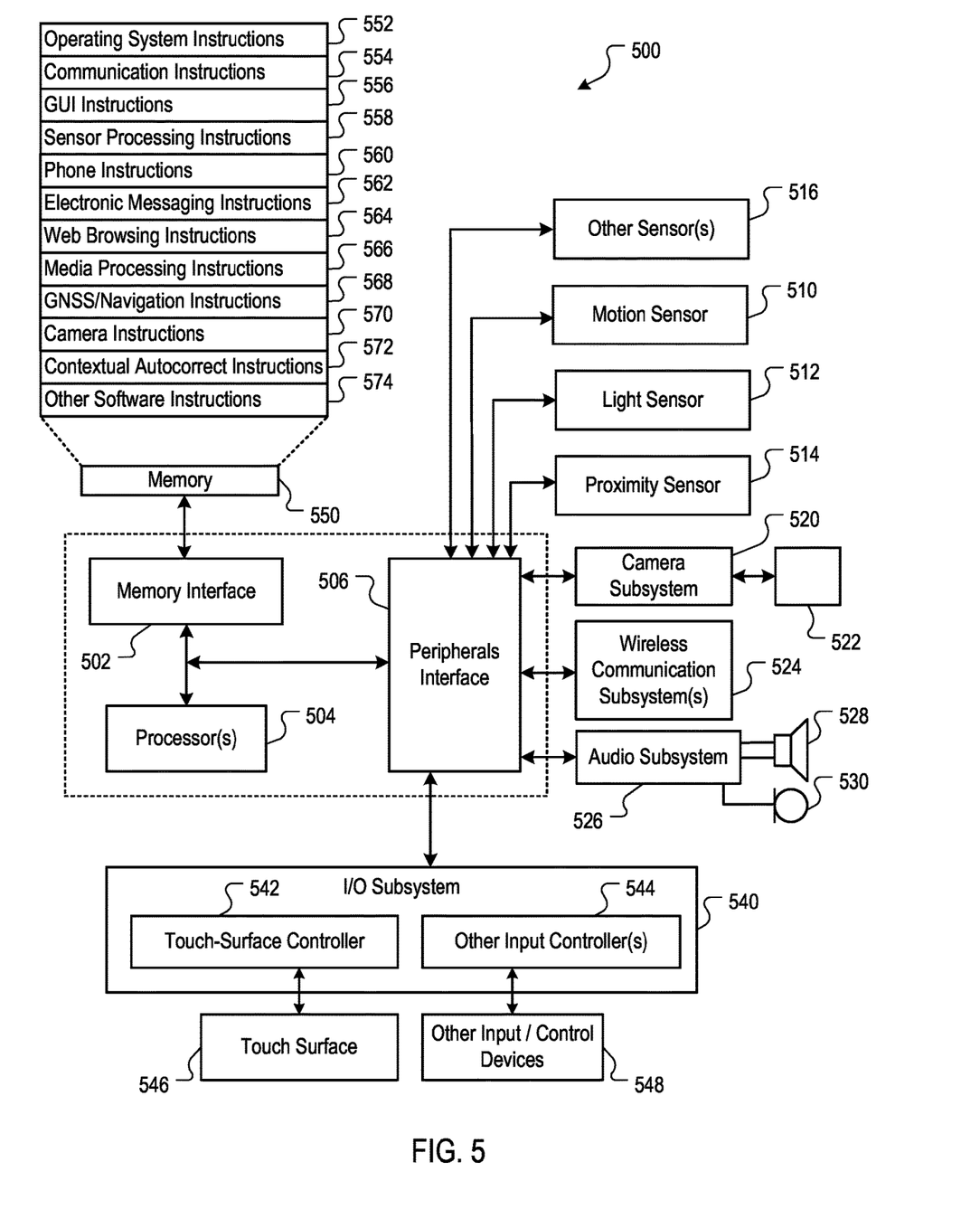
FIG. 5 is a block diagram of an example computing device that can implement the features and processes of FIGS. 1-4.

FIG. 5 is a block diagram of an example computing device 500 that can implement the features and processes of FIGS. 1-4. The computing device 500 can include a memory interface 502, one or more data processors, image processors and/or central processing units 504, and a peripherals interface 506. The memory interface 502, the one or more processors 504 and/or the peripherals interface 506 can be separate components or can be integrated in one or more integrated circuits. The various components in the computing device 500 can be coupled by one or more communication buses or signal lines.

Sensors, devices, and subsystems can be coupled to the peripherals interface 506 to facilitate multiple functionalities. For example, a motion sensor 510, a light sensor 512, and a proximity sensor 514 can be coupled to the peripherals interface 506 to facilitate orientation, lighting, and proximity functions. Other sensors 516 can also be connected to the peripherals interface 506, such as a global navigation satellite system (GNSS) (e.g., GPS receiver), a temperature sensor, a biometric sensor, magnetometer or other sensing device, to facilitate related functionalities.

A camera subsystem 520 and an optical sensor 522, e.g., a charged coupled device (CCD) or a complementary metal-oxide semiconductor (CMOS) optical sensor, can be utilized to facilitate camera functions, such as recording photographs and video clips. The camera subsystem 520 and the optical sensor 522 can be used to collect images of a user to be used during authentication of a user, e.g., by performing facial recognition analysis.

Communication functions can be facilitated through one or more wireless communication subsystems 524, which can include radio frequency receivers and transmitters and/or optical (e.g., infrared) receivers and transmitters. The specific design and implementation of the communication subsystem 524 can depend on the communication network(s) over which the computing device 500 is intended to operate. For example, the computing device 500 can include communication subsystems 524 designed to operate over a GSM network, a GPRS network, an EDGE network, a Wi-Fi or WiMax network, and a Bluetooth™ network. In particular, the wireless communication subsystems 524 can include hosting protocols such that the device 100 can be configured as a base station for other wireless devices.

An audio subsystem 526 can be coupled to a speaker 528 and a microphone 530 to facilitate voice-enabled functions, such as speaker recognition, voice replication, digital recording, and telephony functions. The audio subsystem 526 can be configured to facilitate processing voice commands, voiceprinting and voice authentication, for example.

The I/O subsystem 540 can include a touch-surface controller 542 and/or other input controller(s) 544. The touch-surface controller 542 can be coupled to a touch surface 546. The touch surface 546 and touch-surface controller 542 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 546.

The other input controller(s) 544 can be coupled to other input/control devices 548, such as one or more buttons, rocker switches, thumb-wheel, infrared port, USB port, and/or a pointer device such as a stylus. The one or more buttons (not shown) can include an up/down button for volume control of the speaker 528 and/or the microphone 530.

In one implementation, a pressing of the button for a first duration can disengage a lock of the touch surface 546; and a pressing of the button for a second duration that is longer than the first duration can turn power to the computing device 500 on or off. Pressing the button for a third duration can activate a voice control, or voice command, module that enables the user to speak commands into the microphone 530 to cause the device to execute the spoken command. The user can customize a functionality of one or more of the buttons. The touch surface 546 can, for example, also be used to implement virtual or soft buttons and/or a keyboard.

The memory interface 502 can be coupled to memory 550. The memory 550 can include high-speed random access memory and/or non-volatile memory, such as one or more magnetic disk storage devices, one or more optical storage devices, and/or flash memory (e.g., NAND, NOR). The memory 550 can store an operating system 552, such as Darwin, RTXC, LINUX, UNIX, MAC OS, iOS, WINDOWS, or an embedded operating system such as VxWorks.

The operating system 552 can include instructions for handling basic system services and for performing hardware dependent tasks. In some implementations, the operating system 552 can be a kernel (e.g., UNIX kernel). In some implementations, the operating system 552 can include instructions for performing voice authentication. For example, operating system 552 can implement the contextual user input correction features as described with reference to FIGS. 1-4.

The memory 550 can also store communication instructions 554 to facilitate communicating with one or more additional devices, one or more computers and/or one or more servers. The memory 550 can include graphical user interface instructions 556 to facilitate graphic user interface processing; sensor processing instructions 558 to facilitate sensor-related processing and functions; phone instructions 560 to facilitate phone-related processes and functions; electronic messaging instructions 562 to facilitate electronic-messaging related processes and functions; web browsing instructions 564 to facilitate web browsing-related processes and functions; media processing instructions 566 to facilitate media processing-related processes and functions; GNSS/Navigation instructions 568 to facilitate GNSS and navigation-related processes and instructions; and/or camera instructions 570 to facilitate camera-related processes and functions.

The memory 550 can store other software instructions 572 to facilitate other processes and functions, such as the contextual user input correction processes and functions as described with reference to FIGS. 1-4.

The memory 550 can also store other software instructions 574, such as web video instructions to facilitate web video-related processes and functions; and/or web shopping instructions to facilitate web shopping-related processes and functions. In some implementations, the media processing instructions 566 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 550 can include additional instructions or fewer instructions. Furthermore, various functions of the computing device 500 can be implemented in hardware and/or in software, including in one or more signal processing and/or application specific integrated circuits.

What is claimed is:

1. A method comprising:
  synchronizing a context entry generated at a first computing device to a second computing device different than the first computing device, wherein the context entry is generated based on a first user input from the first computing device that selects a content item;
  receiving, by the second computing device, a second user input specifying a word;
  generating, by the second computing device, a correction suggestion for the specified word based on a context entry in a context dictionary; and causing, by the second computing device, the correction suggestion to be presented on a display of the second computing device.

2. The method of claim 1, comprising:
identifying the first computing device and the second computing device as being used by a common user who provided the first user input and the second user input; and
synchronizing the context dictionary based upon identifying the first computing device and the second computing device as being used by the common user.

3. The method of claim 1, wherein the second user input comprises a textual input, a voice input, or both specifying the word; and
the correction suggestion comprises an alternative word with a different context than the word, the different context based upon a context of the content item selected via the first user input, as indicated by the synchronized context entry on the second computing device.

4. The method of claim 1, comprising:
determining that the second user input is not in a standard dictionary used for spell checking, indicating a likely misspelling of the second user input;
determining that the second user input is associated with at least one context entry in the context dictionary; and
based upon the second user input being associated with the at least one context entry in the context dictionary:
identifying the correction suggestion to be retaining the second user input without modification, despite not being in the standard dictionary; and
refraining from providing an indication of the likely misspelling of the second user input.

5. The method of claim 1, comprising:
determining that the second user input is in a standard dictionary used for spell checking, indicating a possible correct spelling of the second user input;
determining that the second user input is different from, but associated with at least one context entry in the context dictionary; and
based upon the second user input being different from, but associated with the at least one context entry in the context dictionary, identifying the correction suggestion to be the at least one context entry, despite the second user input being in the standard dictionary.

6. The method of claim 5, wherein the second user input is different from, but associated with the at least one context entry in the context dictionary based upon the second user input being a homophone of the content item indicated by the at least one context entry.

7. The method of claim 1, comprising:
identifying that the second user input is ambiguous; and
in response to identifying that the second user input is ambiguous, generate the correction suggestion based on the context entry.

8. The method of claim 1, comprising:
identifying, from a timestamp associated with the context entry, an amount of time that has passed since the first user input was made;
based upon the amount of time that has passed, determine whether the context entry is inactive; and
refrain from basing correction suggestions on the context entry when the context entry is inactive.

9. The method of claim 1, wherein the context entry is based upon contact information associated with a contact stored in a contacts application of the first computing device.

10. A tangible, non-transitory, computer-readable medium, comprising computer-readable instructions, that when executed by one or more processors of one or more computers, cause the one or more computers to:
receive, a first user input, via a first computing device, selecting a content item;
generate, one or more context entries in a context dictionary of the first computing device based on the selected content item;
cause synchronization of the context dictionary of the first computing device to a context dictionary of a separate computing device, by providing, to the separate computing device, the context dictionary, causing the separate computing device to generate a correction suggestion for a specified word provided via an input at the separate computing device, based on a context entry indicating a context of the selected content item in the context dictionary of the separate computing device and present the correction suggestion.

11. The tangible, non-transitory, computer-readable medium of claim 10, comprising computer-readable instructions, that when executed by the one or more processors of the one or more computers, cause the one or more computers to:
provide, in the one or more context entries, an indication of whether the one or more context entries are active, to cause the separate computing device to refrain from generating the correcting suggestion for the specified word based upon inactive context entries of the one or more context entries.

12. The tangible, non-transitory, computer-readable medium of claim 10, comprising computer-readable instructions, that when executed by the one or more processors of the one or more computers, cause the one or more computers to:
identify a subset of the one or more context entries that are associated with selected content items that have not been selected within a threshold amount of time as expired context entries; and
remove the expired context entries from the context dictionary.

13. The tangible, non-transitory, computer-readable medium of claim 10, comprising computer-readable instructions, that when executed by the one or more processors of the one or more computers, cause the one or more computers to:
identify the separate computing device based upon use of the separate computing device by a user that provided the first user input.

14. The tangible, non-transitory, computer-readable medium of claim 10, wherein the correction suggestion comprises an alternative word with a different context than the specified word, the different context based upon the context of the selected content item, as indicated by the synchronized context dictionary of the separate computing device.

15. A tangible, non-transitory, computer-readable medium, comprising computer-readable instructions, that when executed by one or more processors of one or more computers, cause the one or more computers to:
synchronize a context entry generated at a first computing device to a second computing device different than the first computing device, wherein the context entry is generated based on a first user input from the first computing device that selects a content item;
receive, by the second computing device, a second user input specifying a word;

generate, by the second computing device, a correction suggestion for the specified word based on a context entry in a context dictionary; and cause, by the second computing device, the correction suggestion to be presented on a display of the second computing device, wherein the correction suggestion comprises an alternative word with a different context than the specified word that is based upon a context of the content item selected via the first user input, as indicated by the context entry.

16. The tangible, non-transitory, computer-readable medium of claim 15, comprising computer-readable instructions, that when executed by the one or more processors of the one or more computers, cause the one or more computers to:

identify the first computing device and the second computing device as being used by a common user who provided the first user input and the second user input; and synchronize the context dictionary based upon identifying the first computing device and the second computing device as being used by the common user.

17. The tangible, non-transitory, computer-readable medium of claim 15, comprising computer-readable instructions, that when executed by the one or more processors of the one or more computers, cause the one or more computers to:

determine that the second user input is not in a standard dictionary used for spell checking, indicating a likely misspelling of the second user input;

determine that the second user input is associated with at least one context entry in the context dictionary; and based upon the second user input being associated with the at least one context entry in the context dictionary:

identify the correction suggestion to be retaining the second user input without modification, despite not being in the standard dictionary; and refrain from providing an indication of the likely misspelling of the second user input.

18. The tangible, non-transitory, computer-readable medium of claim 15, comprising computer-readable instructions, that when executed by the one or more processors of the one or more computers, cause the one or more computers to:

determine that the second user input is in a standard dictionary used for spell checking, indicating a possible correct spelling of the second user input;

determine that the second user input is different from, but associated with at least one context entry in the context dictionary; and based upon the second user input being different from, but associated with the at least one context entry in the context dictionary, identify the correction suggestion to be the at least one context entry, despite the second user input being in the standard dictionary.

19. The tangible, non-transitory, computer-readable medium of claim 18, wherein the second user input is different from, but associated with the at least one context entry in the context dictionary based upon the second user input being a homophone of the content item indicated by the at least one context entry.

20. The tangible, non-transitory, computer-readable medium of claim 15, comprising computer-readable instructions, that when executed by the one or more processors of the one or more computers, cause the one or more computers to:

identify, from a timestamp associated with the context entry, an amount of time that has passed since the first user input was made;

based upon the amount of time that has passed, determine whether the context entry is inactive; and refrain from basing correction suggestions on the context entry when the context entry is inactive.

* * * * *